(12) United States Patent
Le Besnerais

(10) Patent No.: US 8,772,956 B2
(45) Date of Patent: Jul. 8, 2014

(54) GENERATOR FOR AN ELECTRICAL MACHINE

(75) Inventor: Jean Le Besnerais, Mons en Baroeul (FR)

(73) Assignee: Siemens Aktiengesellschaft, Munich (DE)

( * ) Notice: Subject to any disclaimer, the term of this patent is extended or adjusted under 35 U.S.C. 154(b) by 338 days.

(21) Appl. No.: 13/225,931

(22) Filed: Sep. 6, 2011

(65) Prior Publication Data

US 2012/0074708 A1 Mar. 29, 2012

(30) Foreign Application Priority Data

Sep. 24, 2010 (EP) .................................. 10179276

(51) Int. Cl.
*H02K 1/20* (2006.01)

(52) U.S. Cl.
USPC ............................................. 290/55; 310/65

(58) Field of Classification Search
CPC ................................ H02K 1/20; Y02E 10/725
See application file for complete search history.

(56) References Cited

U.S. PATENT DOCUMENTS

| | | | |
|---|---|---|---|
| 6,104,111 A * | 8/2000 | Pullen et al. .................... | 310/59 |
| 6,376,945 B1 * | 4/2002 | Fogarty .......................... | 310/58 |
| 6,933,648 B2 * | 8/2005 | Buchan et al. ................. | 310/214 |
| 7,242,119 B2 * | 7/2007 | Gomes De Lima ............. | 310/52 |
| 7,411,323 B2 * | 8/2008 | Pfannschmidt et al. ........ | 310/58 |
| 2003/0048030 A1 | 3/2003 | Griffith et al. | |
| 2009/0140526 A1 * | 6/2009 | Jansen et al. .................... | 290/55 |
| 2011/0083467 A1 * | 4/2011 | Asano et al. ................... | 62/498 |
| 2011/0215661 A1 * | 9/2011 | Kabata et al. .................. | 310/59 |

FOREIGN PATENT DOCUMENTS

| | | |
|---|---|---|
| CN | 101079558 A | 11/2007 |
| DE | 321951 C | 6/1920 |
| DE | 10 2004 031 329 A1 | 1/2006 |
| EP | 1174980 A1 | 1/2002 |
| FR | 2116088 A5 | 7/1972 |
| JP | S52129909 A | 10/1977 |

* cited by examiner

*Primary Examiner* — Michael Zarroli

(57) ABSTRACT

A generator for an electrical machine having a stator and a rotor is provided. The rotor is rotatable around a center axis and relatively to the stator. The stator is built of a stator stack with a number of adjacently disposed metal plates and the stator further includes a number of stator windings which are at least partially wound around the metal plates with a certain distance to each other. At least one radial duct-like channel is provided between two or more adjacently disposed metal plates by spacers, wherein the spacers are arranged underneath the stator windings in such a manner that the at least one radial duct-like channel is radially open.

10 Claims, 2 Drawing Sheets

GENERATOR FOR AN ELECTRICAL MACHINE

CROSS REFERENCE TO RELATED APPLICATIONS

This application claims priority of European Patent Application No. 10179276.0 EP filed Sep. 24, 2010, which is incorporated by reference herein in its entirety.

FIELD OF INVENTION

The invention relates to a generator for an electrical machine having a stator and a rotor, with the rotor being rotatable around a centre axis and relatively to the stator and the stator being built of a stator stack comprising a number of adjacently disposed metal plates, and the stator comprising a number of stator windings at least partially wound around the metal plates with a certain distance to each other, whereby at least one radial duct-like channel is provided between two or more adjacently disposed metal plates by means of at least one spacer.

BACKGROUND OF INVENTION

Electromagnetic losses causing undesired heating represent a well-known problem during the operation of electrical machines, such as generators or the like. The heating may lead to lowered efficiency or even to damage or a reduction of the lifetime, particularly the insulation lifetime of the electrical machine.

Hence, it has been proposed to cool the stator stack by blowing a gaseous cooling medium such as air for instance through the ends of the stator windings, that is the end windings into the air-gap between the stator and the rotor and additionally through radial duct-like channels, which are usually provided by means of so called spacers.

The spacers are generally of a rectangular shape and disposed between two or more adjacently disposed metal plates, that is when considering a top-view of the stator the spacers are usually arranged "in the middle" of two successive stator windings. Thereby, the spacers provide a certain gap between two or diverse groups of adjacently disposed metal plates since they provide a free volume through which a gas may flow in order to cool the stator windings and the surrounding stator lamination. Thus, on the one hand the spacers increase the gas flow in the radial duct-like channels, whereas on the other hand the pressure drop within the duct-like channel is increased due to the mentioned arrangement of the spacers inhibiting a desired gas flow through the stator. Generally, the metal plates may comprise a ring-like shape or in the case of a segmented stator the shape of a ring-segment.

Aside, so called pinpoint-spacers may be randomly distributed in between the stator stack or the stator lamination in order to withstand the axial pressure of the stator lamination. Likewise, pinpoint-spacers may further increase turbulence.

Yet, the given means may not always assure proper or sufficient cooling of an electrical machine, in particular as the known arrangement of spacers may negatively affect the flow of the gaseous cooling medium as mentioned above.

SUMMARY OF INVENTION

It is an object of the claimed invention to improve the cooling properties of a generator.

This is achieved by a generator as described above, wherein the spacer is arranged underneath the stator windings in such a manner that the radial duct-like channel is radially open.

The invention provides a generator having optimized cooling properties due to the inventive arrangement of the spacers underneath the stator windings. Hence, the spacers do not extend into the at least one radial duct-like channel, which leads to an improved gas flow, particularly air flow within the generator and particularly the stator and further to a reduction of the problematic pressure drop known from prior art. According to the invention, the spacers are arranged in the slipstream of the stator windings, that is they do not inhibit the gas flow and consequently contribute to the provision of higher gas flows at a given fan power resulting in better gas cooling capability of the generator as a whole since the radial duct-like channels are essentially open. A gas stream may flow in undisturbed manner through the radial duct-like channels. The inventive generator is preferably but not exclusively used as an electrical machine for wind turbines.

It is of advantage when the spacers have an aerodynamic shape. In such a manner, a further improved gas-flow through the stator of the generator is attainable. Aerodynamic shape may control or direct a gas-flow in a desired manner contributing to improving the cooling capability of the generator as a whole. Specific surface structures of the spacers may also be of advantage since they may also support proper conveyance of a gaseous cooling medium within the generator, that is especially the stator radial duct-like channels.

Thereby, the aerodynamic shape of the spacers may be provided by a wedge-like or cone-like shape. The shapes are notably adapted to control or direct a gas-flow. Nevertheless, other shapes of the spacers than wedge- or cone-shapes are of course applicable as well.

In further embodiment of the invention the spacers are made of a thermally conductive material. Thereby, the spacers may drag heat from other stator windings which additionally increases the cooling capability of the generator. Of course, possibly required means for better transport of thermal energy such as heat transfer pastes or the like may be useful.

It is preferred, that the thermally conductive material is a metal, in particular a copper-based metal. Metals usually comprise good thermal conductivities, that is have comparatively high coefficients of thermal conductivity and hence, contribute to good heat transfer behaviour of the spacers. Thereby, copper or copper-alloys are in favour since they exhibit outstanding heat conducting capabilities. It is understood that other materials having good heat conducting behaviour such as highly graphite filled polymers for instance are applicable as well.

It is thinkable, that additional pinpoint-spacers are provided with the stator stack. The pinpoint-spacers support with standing the pressure or load applied from the stator stack, that is keeping up the gap provided by the spacers between the metal plates of the stator stack. In other words, additional pinpoint-spacers are useful if the original spacers cannot withstand the load applied by the stator stack by themselves. Aside, pinpoint-spacers lead to turbulences of the flowing gas which positively affects the gas-flow and further cooling of the stator as well.

The invention also refers to a wind turbine comprising a generator as described before.

BRIEF DESCRIPTION OF THE DRAWINGS

In the following the claimed invention is described in detail as reference is made to the figures, whereby

DETAILED DESCRIPTION OF INVENTION

Figure 1:
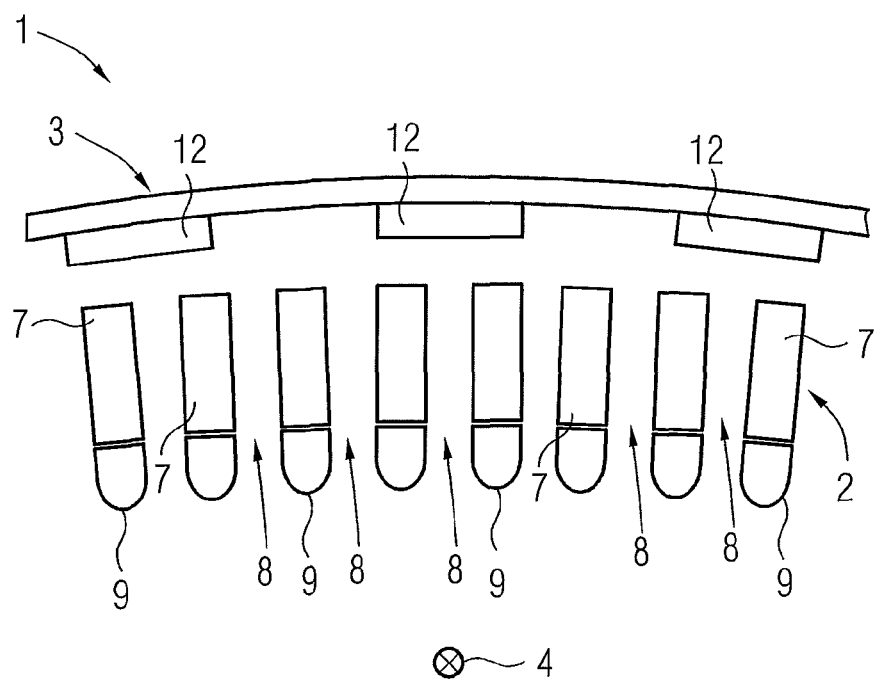
FIG. 1 shows a principle front-view of a generator according to an exemplary embodiment of the claimed invention.

FIG. 1 shows a principle front-view of a generator 1 according to an exemplary embodiment of the invention. The generator 1, which is preferably used as an electrical machine in a wind turbine, comprises a stator 2 and a rotor 3 having a number of rotor magnets 12. The rotor 3 is rotatable around a centre axis 4 and relatively to the stator 2. The stator 2 is built of a stator stack 5 (cf. FIGS. 2, 3) comprising a number of adjacently disposed metal plates 6 (cf. FIGS. 2, 3) made of steel for instance. Stator windings 7 are wound around tooth-like protrusions of the stator stack 5, that is radially extending portions of the respective metal plates 6.

Further, radially extending duct-like channels 8 are provided between groups of adjacently disposed metal plates 6 by means of aerodynamic-shaped spacers 9, whereby the aerodynamic behaviour of the respective spacers 9 may be achieved by a cone-like shape of the spacers 9 for instance. Hence, the radially extending duct-like channels 8 are built by establishing several gaps in between the stator stack 5, that is keeping groups of metal plates 6 in a certain distance to each other. As is discernible from FIG. 3 the stator windings 7 are adjacently disposed with a certain gap, that is the adjacently disposed stator windings 7 do not directly contact each other, in fact the stator windings 7 are arranged with a certain distance to each other.

Figure 2:
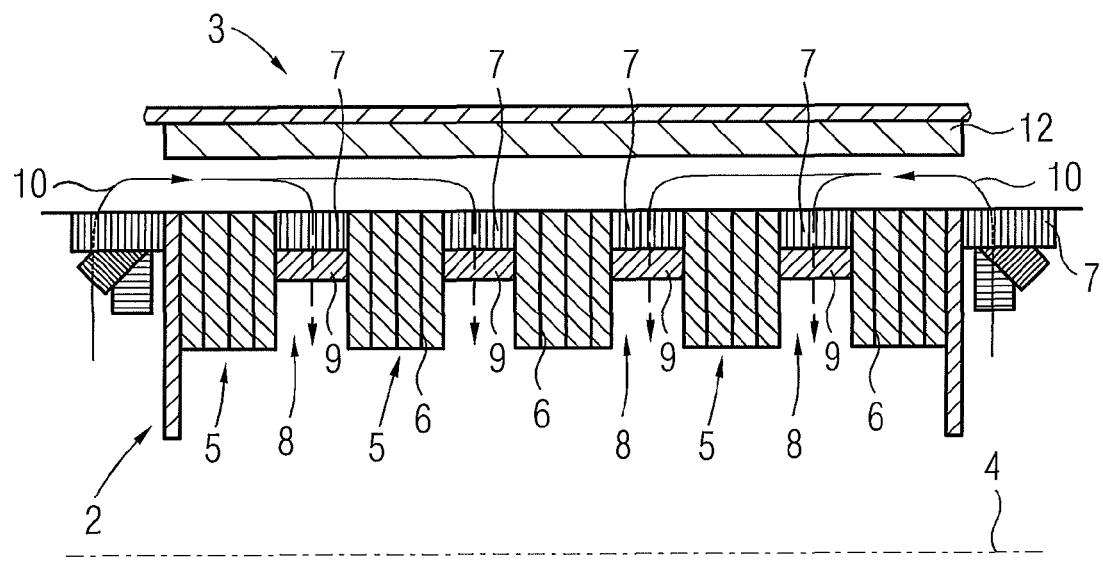
FIG. 2 shows a side view of the generator according to FIG. 1.
Figure 3:
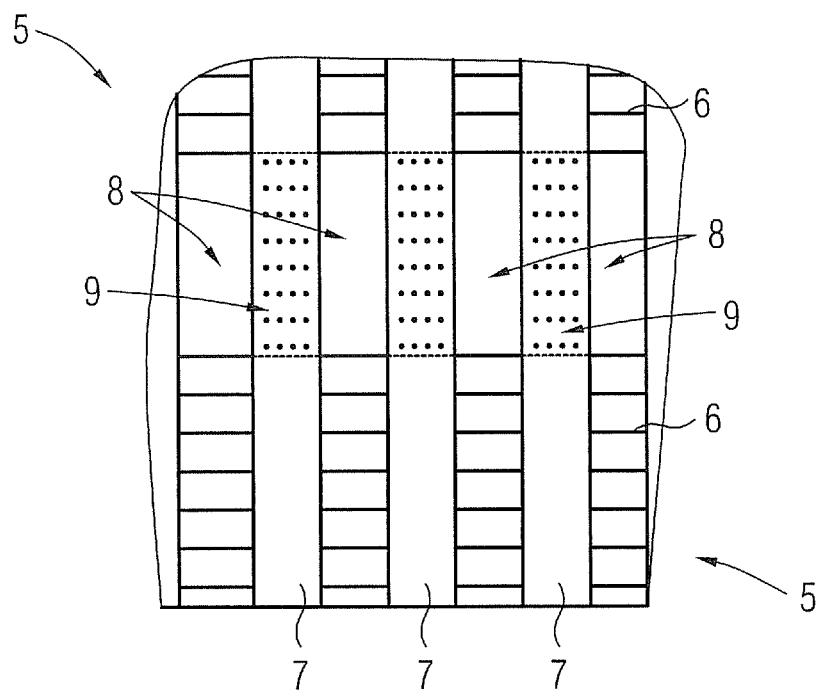
FIG. 3 shows a principle top-view of the stator shown in FIG. 1.

As can be seen from FIGS. 2, 3 the spacers 9 (dotted in FIG. 3) are disposed underneath the stator windings 7, that is in the slipstream of the stator windings 7 in such a manner that they do not inhibit a gaseous cooling medium like air flowing through the duct-like channels 8. Thus, the inventive arrangement of the spacers 9 leads to an improved gas-flow within the generator 1 or at least the stator 2 resulting in a better cooling capability of the generator 1 or the stator 2 respectively. In other words, the inventive arrangement of spacers 9 avoids or at least reduces the problematic pressure drop known from prior art. The inventive arrangement of the spacers 9 results in a higher gas-flow indicated by arrows 10 at a given fan power of a fan (not shown) and at last to an improved air cooling capability of the generator 1 as a whole.

Since the spacers 9 are preferably made of highly thermally conductive materials such as copper, the spacers 9 are further able to drag excess heat off the stator windings 7 by means of thermal conduction. Additionally, the specific inventive arrangement of the spacers 9 contribute to an increased heat exchange surface of stator windings 7 since the spacers 9 built radially inward elongations of the stator windings 7 as is particularly discernible from FIGS. 1, 2.

Figure 4:
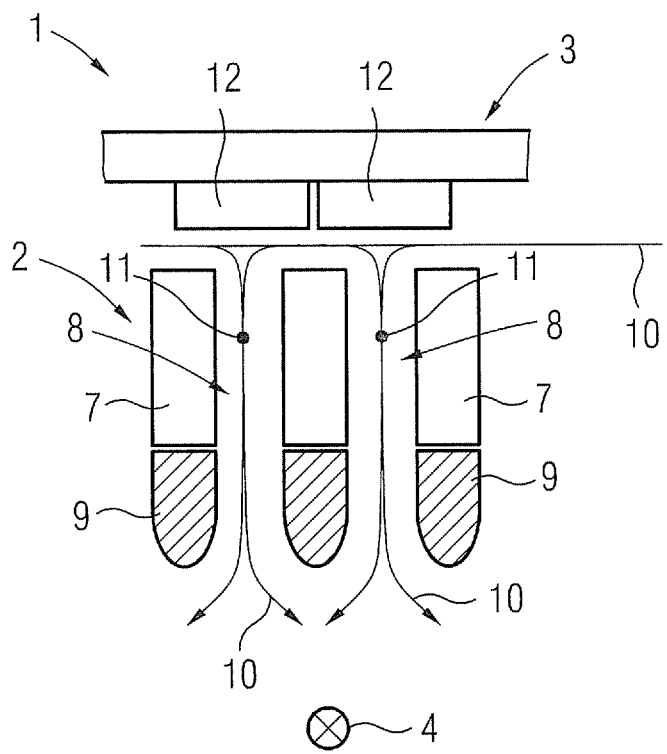
FIG. 4 shows a principle front-view of a generator according to another exemplary embodiment of the claimed invention.

FIG. 4 shows a principle front-view of a generator 1 according to another exemplary embodiment of the invention. The essential difference to the embodiments according to FIGS. 1 to 3 is the provision of additional pinpoint-spacers 11 provided with the stator stack 5. The pinpoint-spacers 11 serve to support the spacers 9 in terms of withstanding the load, that is mainly the axial pressure originating from the laminated metal plates 6 of the stator stack 5. Moreover, the pinpoint-spacers 11 increase turbulence of the gas-flow.

The invention claimed is:

1. A generator, comprising:
   a stator, comprising
      a stator stack with a plurality of adjacently disposed metal plates, and
      a plurality of stator windings which are at least partially wound around the metal plates with a distance to each other;
   a rotor, wherein the rotor is rotatable around a centre axis and relatively to the stator; and
   at least one radial duct-like channel which is arranged between two or more adjacently disposed metal plates by spacers,
   wherein the spacers are arranged underneath the stator windings such that the at least one radial duct-like channel is radially open above and below the stator stack,
   wherein the spacers have an aerodynamic shape, and
   wherein the spacers are a rounded cone-like shape and the rounded portion extends towards the centre axis.

2. The generator according to claim 1, wherein the spacers comprise thermally conductive material.

3. The generator according to claim 2, wherein the thermally conductive material is a copper-based metal.

4. The generator according to claim 1, wherein additional pinpoint-spacers are provided with the stator stack.

5. The generator according to claim 2, wherein the thermally conductive material is a highly graphite filled polymer.

6. A wind turbine, comprising:
   a generator with
      a stator, comprising
         a stator stack with a plurality of adjacently disposed metal plates, and
         a plurality of stator windings which are at least partially wound around the metal plates with a distance to each other;
      a rotor, wherein the rotor is rotatable around a centre axis and relatively to the stator; and
      at least one radial duct-like channel which is arranged between two or more adjacently disposed metal plates by spacers,
      wherein the spacers are arranged underneath the stator windings such that the at least one radial duct-like channel is radially open above and below the stator stack,
   wherein the spacers have an aerodynamic shape, and
   wherein the spacers are a rounded cone-like shape and the rounded portion extends towards the centre axis.

7. The wind turbine according to claim 6, wherein the spacers comprise thermally conductive material.

8. The wind turbine according to claim 7, wherein the thermally conductive material is a copper-based metal.

9. The wind turbine according to claim 6, wherein additional pinpoint-spacers are provided with the stator stack.

10. The wind turbine according to claim 7, wherein the thermally conductive material is a highly graphite filled polymer.

* * * * *